Patented Jan. 1, 1946

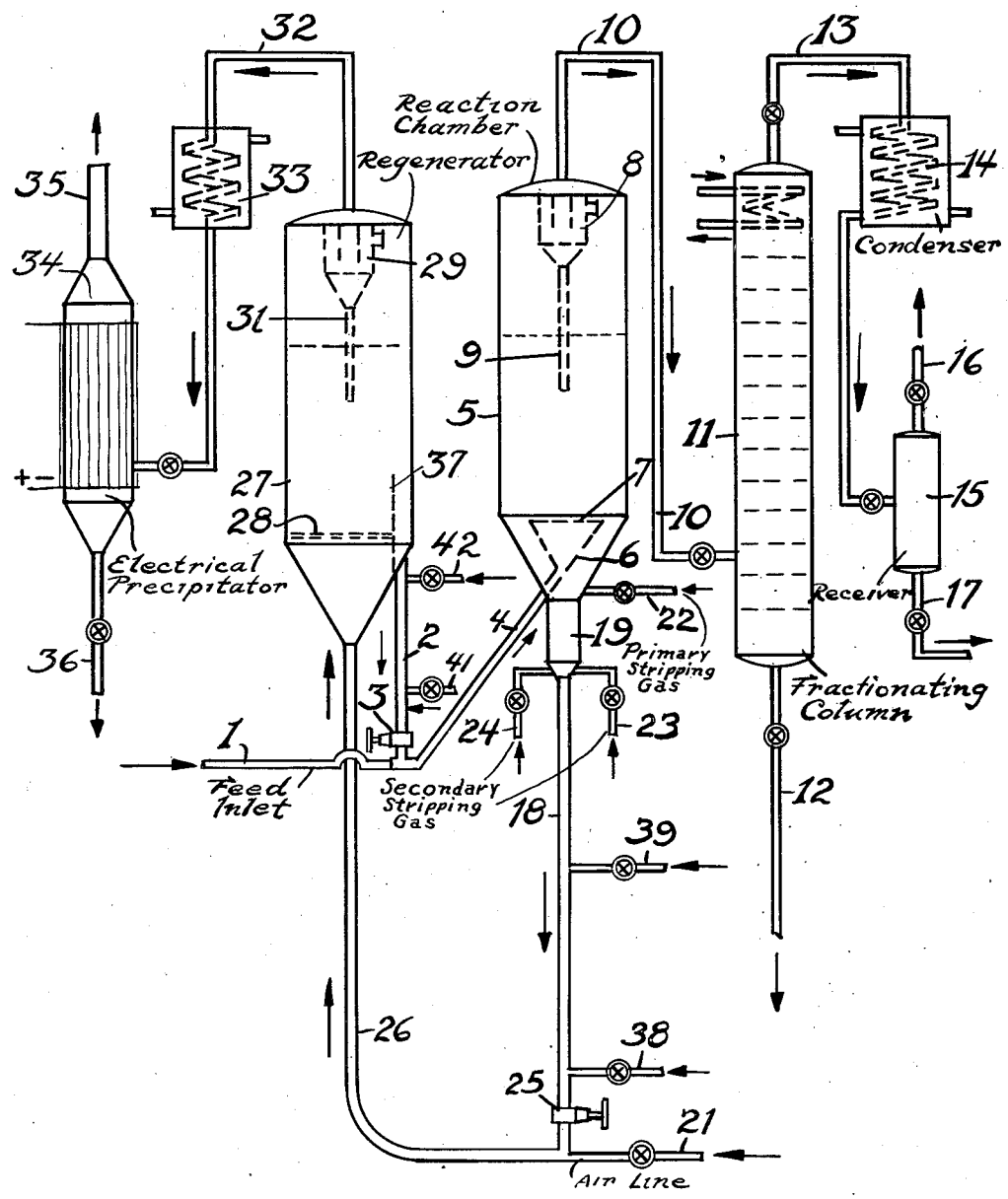

2,391,944

UNITED STATES PATENT OFFICE 2,391,944

CONVERSION OF HYDROCARBON OILS

Leonard E. Carlsmith, Baton Rouge, La., assignor to Standard Oil Development Company, a corporation of Delaware Application August 13, 1943, Serial No. 498,563

3 Claims. (Cl. 196—52)

This invention relates to the conversion of hydrocarbon oils in the presence of a catalyst and is directed more particularly to a method of removing valuable compounds absorbed on or associated with the catalyst prior to subjecting the catalyst to regeneration.

While the invention in its broader phases has a more general application, it is particularly adapted to the conversion of hydrocarbon oils in which the catalyst is continuously circulated through a conversion zone and thereafter through a regenerating zone wherein combustible deposits formed on the catalyst are removed.

It has been a practice heretofore to treat a catalyst which has been utilized for the conversion of hydrocarbon oils prior to subjecting the same to regenerative treatment with a stripping or purging gas to recover valuable products absorbed on or associated with the catalyst and also to avoid burning of such products in the regenerator with a resultant increase in the amount of heat liberated therein. Although various types of stripping gas have been suggested, steam forms the cheapest and most available gas for this purpose. In many cases it has been found that the presence of steam during high temperature regeneration tends to impair the activity of the catalyst. In view of this it has been suggested to employ various other types of stripping gas such as spent combustion gases, low molecular weight hydrocarbon gases, and the like. In general, however, these gases are not available in sufficient quantities or are otherwise unsuitable for accomplishing all of the stripping treatment.

One of the principal objects of the present invention is to provide a more simple and economical method for removing the valuable hydrocarbons from the spent catalyst prior to passing the same to the regeneration zone.

Other detailed objects and advantages of the invention will become apparent from the following description.

In accordance with the present invention, the catalyst after being utilized for carrying out the conversion treatment and before being regenerated is subjected to stripping treatment in two successive stages. In the first stage the spent catalyst is treated with a sufficient volume of gas to remove the valuable constituents from the catalyst. The gas used in this initial stage may comprise steam or other gases which would be objectionable if carried into the regenerator. Following the first stage of the stripping operation the catalyst is treated in a second stage with a relatively smaller quantity of a gas which is not objectionable when carried into the regeneration chamber with the catalyst. This second gas may serve to replace a part or all of the stripping gas employed in the first stage, or the second gas may serve to pacify or inhibit the objectionable effects of the first stripping gas.

With the general nature and objects in view, the invention will be better understood by reference to the accompanying drawing which illustrates the form of equipment which may be utilized in carrying out the invention.

The invention will be described as applied to the cracking of hydrocarbon oils, it being understood that the invention in its broader phase may also be applied to other types of processes, such as hydrogenation, dehydrogenation, polymerization, isomerization, alkylation, reforming, and the like.

Referring to the drawing the reference character 1 designates a charge line through which the oil to be cracked is introduced into the system. This oil may be a clean condensate stock such as a gas oil or it may comprise a residual stock such as a topped or reduced crude. The oil introduced through line 1 may have been preheated in a furnace or other heating equipment (not shown) to the desired reaction temperature, or the heat required for the cracking operation may be supplied by the heat contained in the hot catalyst subsequently added thereto, as later described. Freshly regenerated catalyst in finely divided form is discharged into the feed line 1 through a vertical tube or column 2 having a control valve 3 for regulating the amount of catalyst introduced into the oil stream. The catalyst employed for the cracking operation may be an activated clay or a synthetic gel comprising silica and alumina or other types of adsorbent gels suitable for effective cracking treatment.

It is preferred to employ catalysts in a finely divided form having a particle size finer than 200 mesh. The amount of catalyst introduced into the oil stream may vary over a considerable range depending upon the type of oil treated, the degree of conversion desired, type of products desired, the temperature of the cracking treatment, and other factors. In general the amount of catalyst so introduced will be of the order of from 1 to 20 parts of catalyst per part of oil by weight. The mixture of oil and catalyst formed in the feed line 1 is passed through line 4 into the bottom portion of a reaction chamber 5.

In order to distribute the suspension uniformly over the full area of the chamber it is desirable to introduce the suspension into the reaction chamber through a distributing cone 6 located in the bottom section of the chamber. This distributing cone 6 has a perforated grid 7 through which the suspension passes into the reaction chamber.

The distributing cone 6 is preferably spaced from the outer wall of the reaction chamber 5 as illustrated to form an annular space for the removal of the catalyst from the reaction chamber for subsequent regeneration, as later described.

The oil prior to being introduced into the reaction chamber is vaporized either prior to mixing the catalyst therewith or by adding sufficient hot catalyst to the oil to effect the vaporization. When employing a topped or reduced crude in the cracking process the amount of catalyst intermixed with the oil should be sufficient to completely absorb the unvaporized constituents of the crude and thereby form a relatively dry suspension of oil vapors and catalyst.

The velocity of the oil vapors passing upwardly through the reaction chamber 5 is preferably controlled to cause the bulk of the catalyst to segregate into a relatively dense layer in the bottom portion of the reaction chamber, as illustrated.

When employing catalyst having a particle size of the order above mentioned, this velocity may be of the order of from 0.5 to 5 feet per second and preferably between 1 and 3 feet per second.

The reaction chamber is preferably constructed of such height as to provide a substantial free space above the layer of catalyst within the chamber in order to reduce the amount of entrained catalyst removed from the chamber with the gaseous reaction products. In general this free space should be of the order of from 5 to 15 feet or more above the maximum level desired to be maintained within the chamber. The level of the dense layer of catalyst material in the reaction chamber 5 may be regulated within limits by controlling the rate of withdrawal of the catalyst from the chamber. The depth of the layer is regulated to provide adequate contact time for obtaining the desired conversion. When starting up the process and employing fresh catalyst having a relatively high order of activity the level within the reactor will be controlled to give a relatively short contact time so as to avoid overcracking. However, as the activity of the catalyst depreciates, the level of the catalyst is increased, thereby increasing the contact time to compensate for the drop of the activity of the catalyst. The cracked products after passing through the reaction chamber 5 are introduced into a cyclone separator 8 for removal of entrained catalyst contained therein. As illustrated, this separator is shown mounted at the upper end of the reaction chamber. It will be understood, however, that the separator may be positioned outside the chamber. Other suitable separating devices such as filters, precipitators, or the like may be used in place of the cyclone separator.

The catalyst separated from the cracked products in the separator 8 is returned to the lower portion of the reaction chamber through vertical conduit 9. The cracked products after passing through the cyclone 8 are withdrawn through line 10 and may be passed into a fractionating tower 11 wherein the products are subjected to fractionation to segregate the desired products therefrom. Condensate formed in the fractionating tower 11 is withdrawn from the base thereof through line 12. This condensate may contain a small amount of entrained catalyst which is not removed by passage of the gases through separator 8. The condensate removed through line 12 may be treated to separate the catalyst therefrom and the catalyst returned to the reaction chamber or the regenerating chamber. If desired, the fractionating tower 11 may be provided with one or more trap-out trays for separating the condensate formed in the tower into separate fractions of different boiling ranges.

Vapors remaining uncondensed in the fractionating tower 11 are removed overhead through line 13 to a condenser 14 wherein the desired distillate is condensed.

The products from the condenser 14 may thereafter pass to a product receiver 15 in which liquid distillate formed in the condenser 14 is segregated from uncondensed gases. The gases may be removed from the product receiver 15 through line 16 and may be passed to suitable absorption or recovery equipment (not shown) for separating desirable products therefrom. The liquid distillate is withdrawn from product receiver 15 through line 17 as a final product of the process.

Referring again to the reaction chamber 5, a vertical conduit or standpipe 18 connects at its upper end with the bottom of the reaction chamber. The standpipe 18 may have an enlarged section 19 adjacent the bottom of the chamber for effecting the secondary stripping, as later described. Catalyst is continuously withdrawn from the main body of the reaction chamber through the annular space surrounding the distributing cone 6 and discharges into the standpipe 18 from whence it passes into a stream of regenerating gas passing through line 21.

In accordance with the present invention the annular space surrounding the distributing cone 6 through which the catalyst is withdrawn from the reaction chamber serves as a primary stripping zone for the removal of the valuable hydrocarbons associated with the catalyst. To this end a stripping gas such as steam, spent combustion gases, light hydrocarbon gases or the like may be introduced at one point or at several spaced points through line 22. The amount of such stripping gas is controlled to remove substantially all of the valuable hydrocarbons contained on the catalyst.

Further in accordance with the present invention a second stripping agent is introduced into the stream of catalyst being withdrawn from the reaction zone at one point or at several spaced points through lines 23 and 24. The stripping gas employed in the first stage may comprise steam or other gases which would be objectionable if transferred into the regeneration zone. The secondary stripping gas introduced through lines 23 and 24 may comprise a light hydrocarbon gas, air or the like which serves to replace a part or all of the initial stripping gas or which serves to inhibit or pacify the action of the primary stripping gas within the regeneration zone. In cases where air is introduced as a secondary stripping gas, regeneration may be initiated in the vertical column 18, but since the amount of air is relatively small and the heat losses due to radiation are relatively large the temperature resulting from regeneration started in standpipe 18 will be relatively low and consequently the presence of the steam contained therein will not cause deactivation of the catalyst.

The volume of secondary stripping gas introduced through lines 23 and 24 will be relatively small as compared with the primary stripping gas introduced through line 22.

The catalyst after being subjected to the stripping treatment previously described discharges through the base of column 18 through a control valve 25 into a stream of air or other regenerating gas which carries the catalyst through line 26 into the bottom of a regenerating chamber 27. The base of the regenerating chamber 27 is preferably in the form of an inverted cone having a horizontal perforated grid positioned thereabove. The conical section of the regeneration chamber serves as a mixing and distributing zone for distributing the catalyst and regeneration gas uniformly over the full cross-sectional area of the regeneration zone.

The suspension of regeneration gas and catalyst passes through the perforated grid 28 into the main portion of the regeneration chamber at a velocity controlled to prevent the catalyst from accumulating in the conical base.

The velocity of the regeneration gas passing upwardly through the regeneration chamber is also preferably controlled to cause the bulk of the catalyst to segregate into a dense layer in the bottom portion of the chamber, as illustrated. The upward passage of the regeneration gas through the layer tends to maintain the same in a fluid turbulent state thereby keeping a uniform temperature throughout the regeneration zone.

Spent combustion gases after passing through the regeneration zone are passed to a cyclone separator 29 or other suitable separating device for removal of entrained catalyst therefrom. Catalyst so removed is returned to the bottom portion of the regenerator through pipe 31.

The gases removed from the cyclone separator 29 may be passed through line 32 to a cooler 33 in which they are cooled to a temperature of the order of from 300° F. to 600° F. The cooled gases may then be treated to effect more complete removal of the catalyst therefrom. As illustrated, this further purification is accomplished by means of an electrical precipitator 34. The combustion gases after passing through the electrical precipitator may be vented to the atmosphere through a stack 35. The catalyst recovered in the precipitator 34 may be removed through line 36 and returned to the reaction or regenerating chamber or to the circulating stream passing between the two chambers.

The vertical conduit 2 previously referred to has the upper end thereof in open communication with the catalyst within the regenerating chamber. The pipe 2 may have an upper extension projecting upwardly through the grid plate 28 into the main body of the regenerator, or a partition wall 37 may be provided within the chamber to permit a portion of the catalyst to be withdrawn continuously through the conduit 2.

To effect circulation of the catalyst continuously through the reaction and regenerating chamber as previously described, it is necessary to restore pressure on the catalyst which is lost during circulation. This pressure may be restored by constructing the tubes or standpipes 2 and 18 of a height sufficient to generate a fluid pressure at the base thereof sufficient to overcome the pressure drop through the circulating system. In order to generate a fluid pressure by means of the standpipes 2 and 18 it is important that the catalyst be maintained in a fluid state therein. To this end a small amount of aerating gas may be introduced at one point or at several spaced points along the conduit 18 through lines 38 and 39 and along conduit 2 through lines 41 and 42. In some cases the aerating or fluidizing gas introduced into the standpipe 18 through lines 38 and 39 may be sufficient to effect the secondary stripping.

While the invention has been described in connection with the fluid catalyst type of process wherein the finely divided catalyst is maintained in a fluid state during circulation, it will be understood that the invention in its broader aspects is not restricted to this type of cracking process but may be utilized in other types of catalytic cracking operations and particularly operations in which the catalyst is continuously circulated through a cracking and regenerating zone.

Having set forth the preferred embodiment of the invention, it will be understood that it embraces such other variations and modifications as come within the scope of the accompanying claims.

What is desired to be protected by Letters Patent is:

1. In a process for the conversion of hydrocarbon oils wherein the oil is passed through a conversion zone containing a conversion catalyst and wherein the catalyst after being utilized in the conversion treatment is subjected to regeneration in a regeneration zone and thereafter reutilized for further conversion, the improvement in the method of removing valuable constituents from the catalyst utilized in such conversion treatment which comprises initially stripping said catalyst with a relatively large volume of stripping steam which would be objectionable if allowed to pass into the regeneration zone, and thereafter subjecting said catalyst to a second striping treatment with a relatively small volume of gas which is not objectionable in said regenerating zone.

2. In the process defined in claim 1, the further improvement which comprises utilizing air for the second stripping treatment.

3. The process defined in claim 1 wherein the gas employed in the second stripping treatment comprises hydrocarbon gas.

LEONARD E. CARLSMITH.